A. MAY.
JAR LIFTER.
APPLICATION FILED MAR. 16, 1921.

1,420,273.

Patented June 20, 1922.

INVENTOR
ALISON MAY
BY C.B.Birkenbeul
ATTORNEY.

UNITED STATES PATENT OFFICE.

ALISON MAY, OF PORTLAND, OREGON.

JAR LIFTER.

1,420,273.  Specification of Letters Patent.  Patented June 20, 1922.

Application filed March 16, 1921. Serial No. 452,661.

*To all whom it may concern:*

Be it hereby known that I, ALISON MAY, a citizen of the United States, and resident of Portland, county of Multnomah, and State of Oregon, have invented a new and useful Jar Lifter, of which the following is a specification.

This invention relates more particularly to devices for handling glass fruit jars to and from the receptacle in which they are heated.

The object of my invention is to provide an exceedingly simple and efficient means for handling fruit jars, which is easy to engage and release and reliable in operation.

Figure 1:
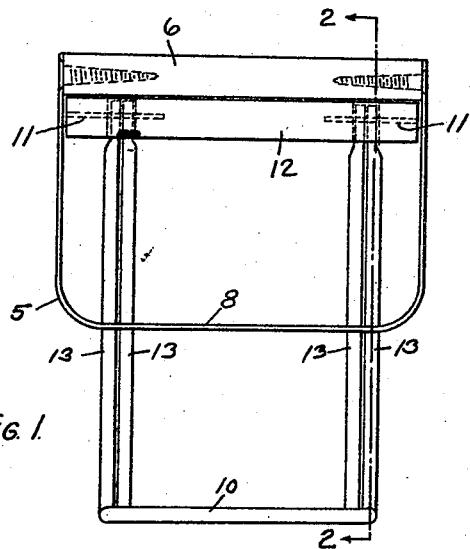
Figure 2:
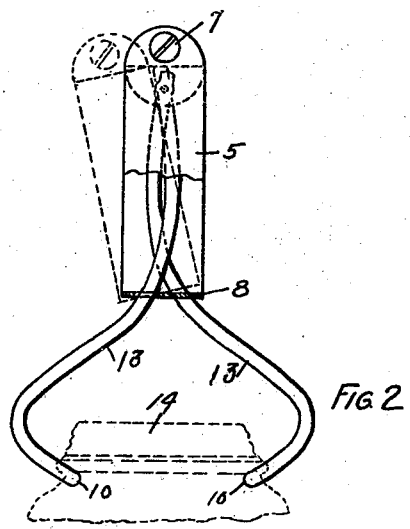
Figure 3:
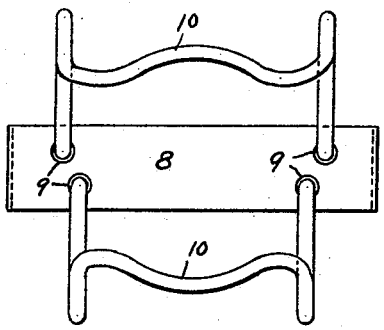
Figure 4:
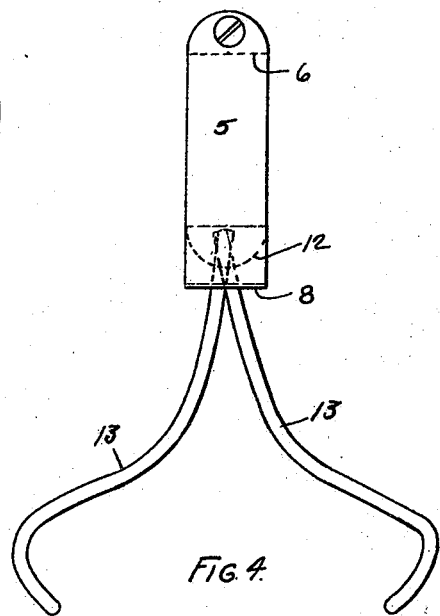

I attain these results in the manner set forth in the following specification and illustrated in the accompanying drawing, in which:

Figure 1 is a front elevation of my device of which Figure 2 is a side elevation shown in section along a part of the line 2—2 in Fig. 1. Figure 3 is a bottom view and Figure 4 a side elevation showing the jaws separated.

Similar numbers of reference refer to the same or similar parts throughout the several views.

Referring in detail to the drawing, I have constructed my device of an inverted U-shaped frame of sheet metal between whose open ends I have secured a half round wooden handle 6 by means of the screws 7. The lower portion 8 of the frame 5 is perforated with openings 9 which are off-set and separated, for reasons which will soon be made apparent. A pair of U-shaped wire jaw members 10 pass through the openings 9 and are pivoted by means of the pins 11 to a second shorter wooden handle 12 which is not secured to the frame 5 or guided thereby.

It will be evident that the side arms 13 of the jaws 10 meet at the pins 11 and diverge through the openings 9. It will be seen that when the handle 12 is depressed the jaws 10 are separated and forced together as the handle 12 is raised.

For convenience in forcing the member 12 downwardly I have not provided the member 5 with guides in order that the handle 12 may be uncovered when releasing a jar 14, as shown in Figure 5.

It will be evident that when lifting a jar with this device the grip of the hand will draw the handles 6 and 12 together, and the greater the weight of the jar the greater compression on the jaws 10. It will readily be seen that the operator of the device is at no time in danger from the steam surrounding the jars, and that the operation of placing a jar in a cooking vessel or removing it from same is tremendously simplified and facilitated.

While I realize that this device may be varied widely in shape and general construction it is not my intention to limit myself to this precise structure, but intend that it shall cover all forms and modifications that fall fairly within the appended claims.

What I claim is:—

1. In a jar lifter, the combination of an inverted U-shaped frame, a handle secured between the open ends of said frame, a slidable handle between the sides of said frame, two opposed U-shaped jaw members whose sides pass through the closed end of said frame and hinged to said slidable handle member.

2. In a jar lifter, the combination of a U-shaped frame member having a half round handle secured across its open end, a slidable half round handle between said frame, and two U-shaped jaw members having their open ends passed through said frame member and joined to said slidable handle.

3. In a jar lifter, the combination of a U-shaped frame member having a handle secured to its open end and having two pairs of adjacent holes in its closed end, the holes of each pair being slightly separated in a direction diagonal with the length of said frame, and two pair of U-shaped wire jaw members whose free ends pass through one of each of the adjacent pairs of holes, and a slidable handle member within said frame and pivotally joined to the free ends of said jaws.

ALISON MAY.